UNITED STATES PATENT OFFICE 2,656,384

FLUORINE CONTAINING UREA DERIVATIVES

Vincent V. Lindgren, Darien, and Jack T. Cassaday, Stamford, Conn., assignors to American Cyanamid Company, New York, N. Y., a corporation of Maine No Drawing. Application June 14, 1950,
Serial No. 168,148

2 Claims. (Cl. 260—553)

The present invention relates to new compounds having the formula

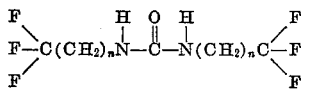

in which n is an integer, and a method for preparing the same.

The 1,3-bis trifluoralkyl ureas of the present invention can be made by reacting a trifluoroamine of the formula $CF_3(CH_2)_nNH_2$, in which n is an integer, with phosgene in aqueous solution in the presence of sufficient alkali, such as sodium hydroxide or the like, to neutralize by-product hydrogen chloride. The mol ratio of amine to phosgene must be at least 2:1.

The following example illustrates without limiting the invention.

Example 1

$$2CF_3CH_2NH_2 + COCl_2 + 2NaOH \longrightarrow$$

$$CF_3CH_2NH\overset{O}{\underset{\|}{C}}NHCH_2CF_3 + 2NaCl + 2H_2O$$

| | |
|---|---|
| $CF_3CH_2NH_2$ | 99 g. (1 mole) |
| $COCl_2$ | 50 g. (0.5 mole) |
| NaOH (in 360 g. $H_2O$) | 40 g. (1 mole) |

The amine was stirred with the aqueous NaOH in a one-liter three-neck flask equipped with a dropping funnel and reflux condenser. The phosgene, dissolved in 125 g. of benzene, was added just above the surface during 80 minutes at 8–18° C. The mixture was then heated to reflux, cooled and filtered. 1,3-bis(2,2,2-trifluoroethyl) urea was obtained as a grey solid, M. P. 158–159° C., weighing 91 g. dry. The yield was 84 per cent.

The process is not limited to the trifluoroethylamine, but other trifluoroalkylamines can be used in the same process. Obviously, alkalies other than NaOH may be used to neutralize the by-product hydrogen chloride of the reaction. The reaction of phosgene and the amine can obviously be conducted under a wide variety of conditions. However, it is preferable to add the phosgene to the amine at room temperature simply by letting the mixture stand, but it is preferred to accelerate the reaction by refluxing the reactants.

The compounds of the present invention are useful as intermediates in the synthesis of organic chemicals, and in the preparation of dyes, synthetic resins, pharmaceuticals, and the like.

While the invention has been described with particular reference to specific embodiments, it is to be understood that it is not to be limited thereto but is to be construed broadly and restricted solely by the scope of the appended claims.

We claim:

1. 1,3-bis(2,2,2-trifluorethyl) urea.

2. The method of making 1,3-bis(2,2,2-trifluorethyl) urea that comprises subjecting phosgene to the action of the trifluoroamine of the formula $F_3CCH_2NH_2$ in aqueous solution in the presence of sufficient alkali to neutralize byproduct hydrogen chloride, the mole ratio of amine to phosgene being at least 2:1, and recovering the thus-formed 1,3-bis(2,2,2-trifluorethyl) urea.

VINCENT V. LINDGREN.
JACK T. CASSADAY.

No references cited.